8 Sheets—Sheet 2.
C. G. & W. H. EMERY.
Cigarette-Machine.
No. 216,164. Patented June 3, 1879.
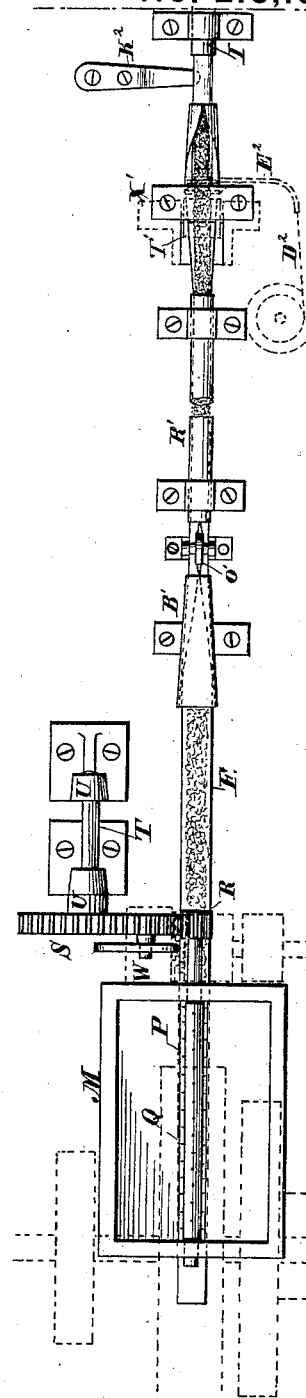
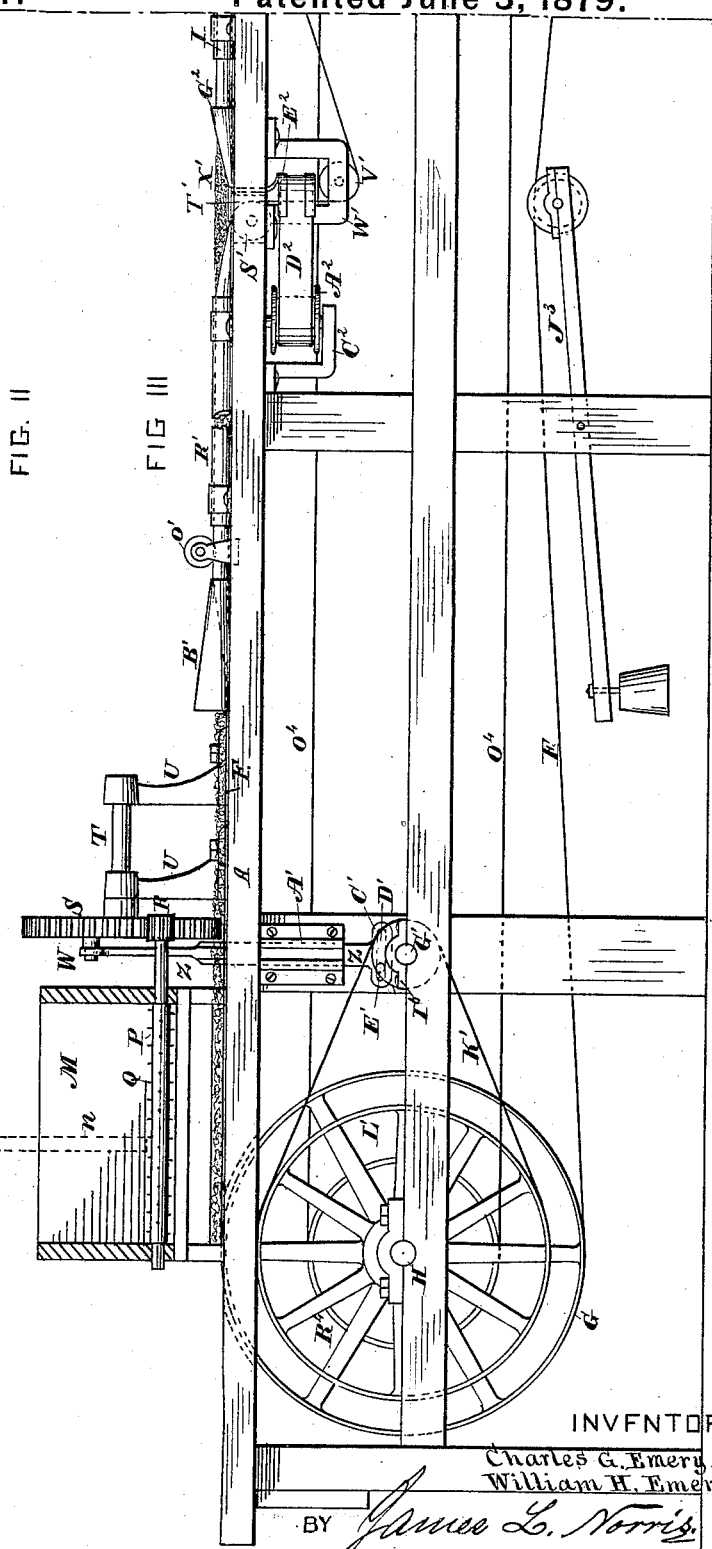
WITNESSES:
Jas. E. Hutchinson
J. A. Rutherford
INVENTORS:
Charles G. Emery,
William H. Emery,
BY James L. Norris.
THEIR ATTORNEY.

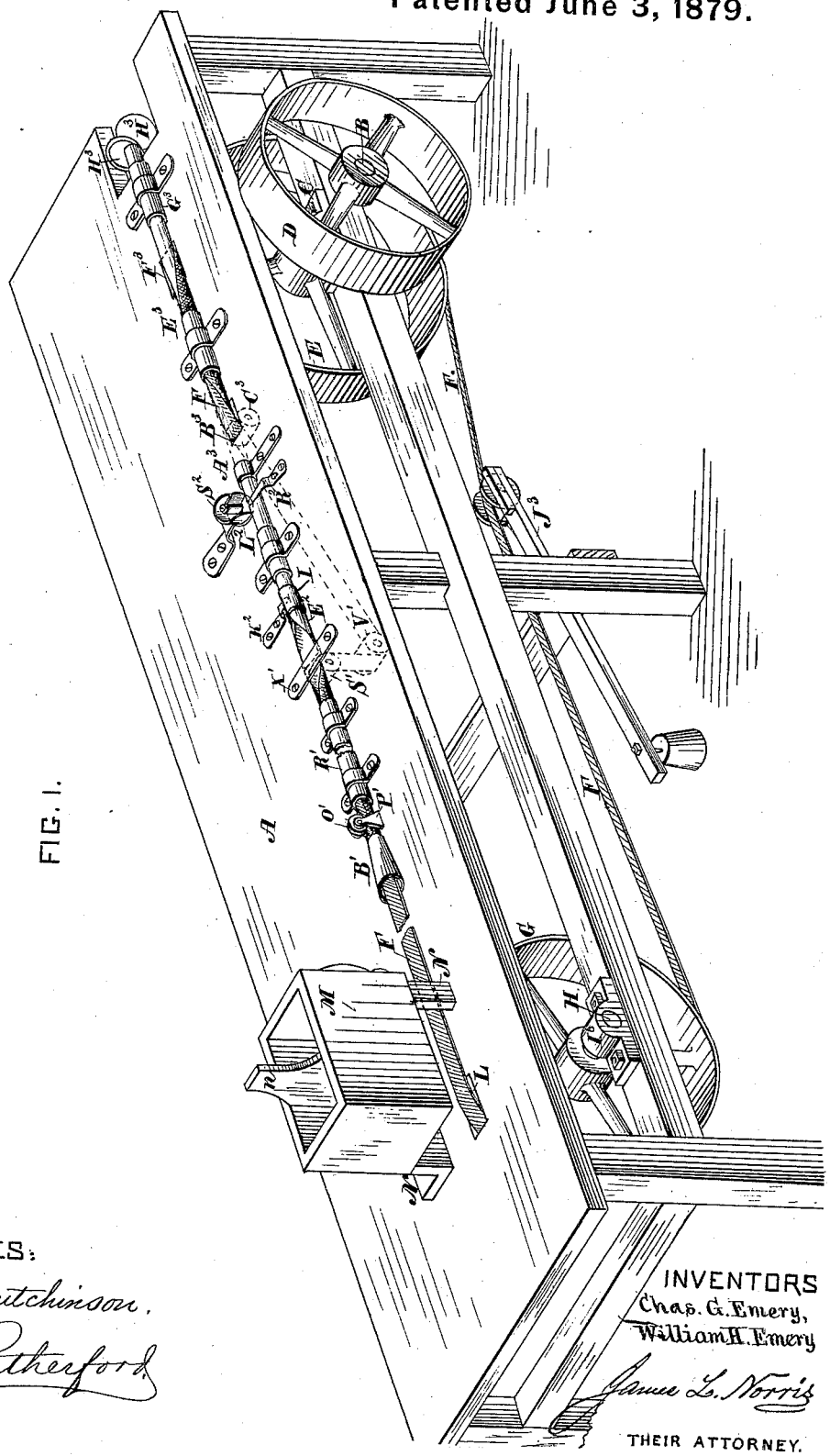

8 Sheets—Sheet 3.
C. G. & W. H. EMERY.
Cigarette-Machine.
No. 216,164. Patented June 3, 1879.
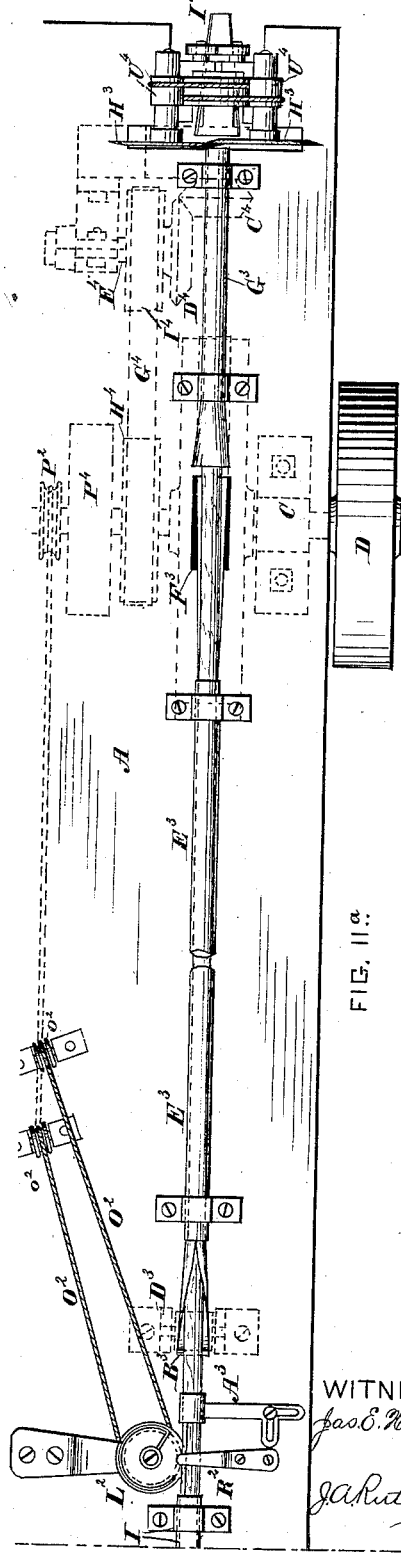
FIG. II$^a$.
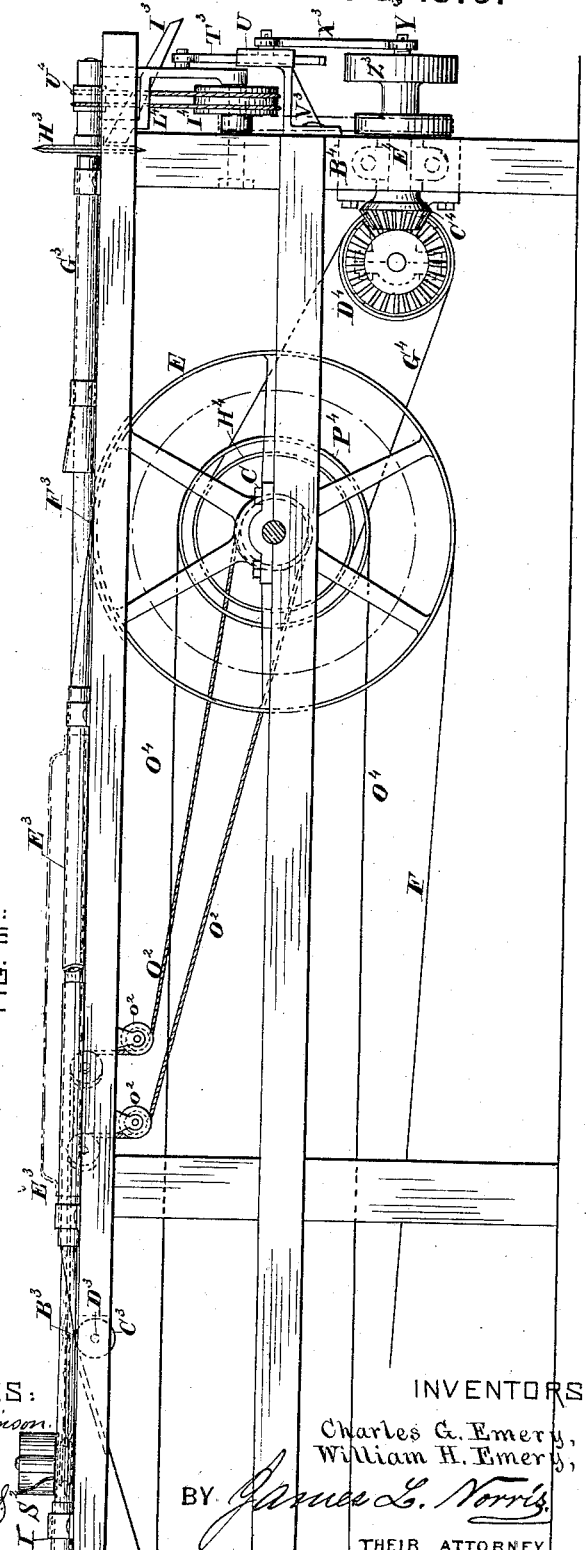
FIG. III$^a$.
WITNESSES:
Jas. E. Hutchinson
J. A. Rutherford
INVENTORS:
Charles G. Emery,
William H. Emery,
BY James L. Norris
THEIR ATTORNEY.

C. G. & W. H. EMERY.
Cigarette-Machine.
No. 216,164. Patented June 3, 1879.
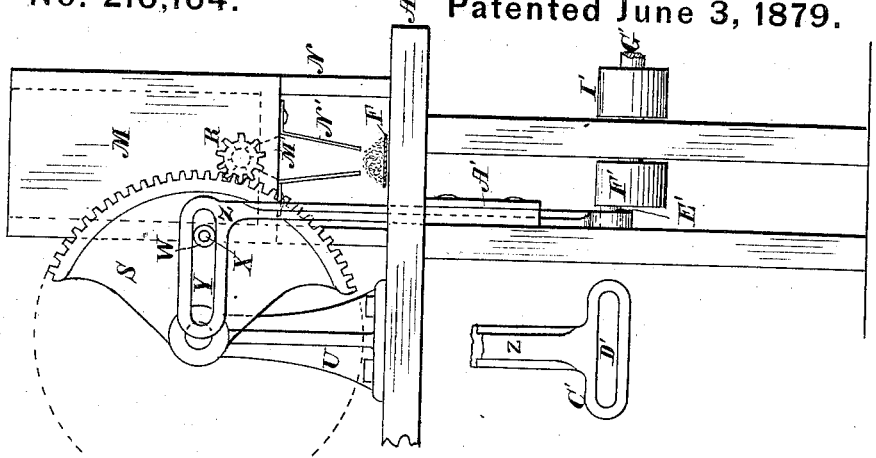
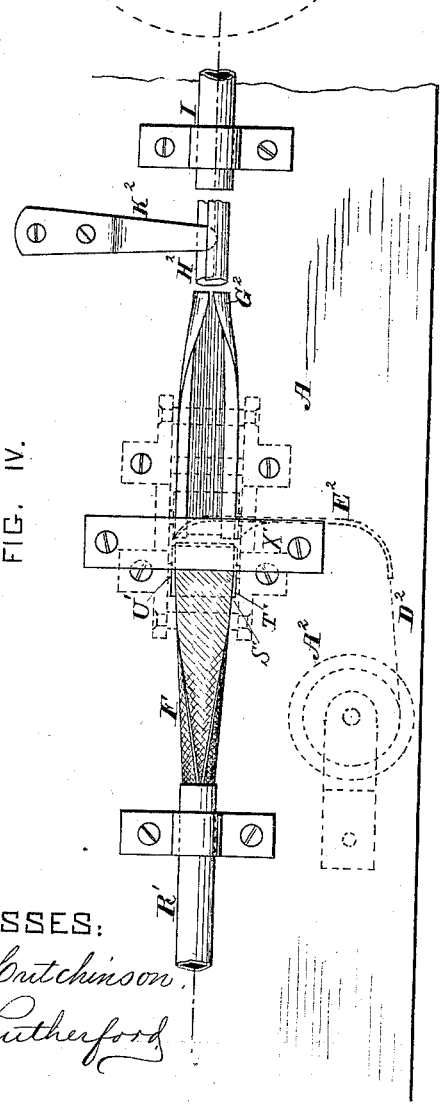
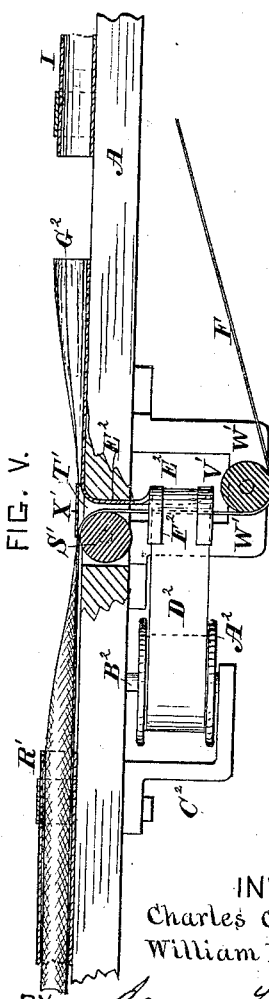
WITNESSES:
Jas. E. Hutchinson
J. A. Rutherford
INVENTORS:
Charles G. Emery,
William H. Emery,
BY James L. Norris
THEIR ATTORNEY.

8 Sheets—Sheet 5.
C. G. & W. H. EMERY.
Cigarette-Machine.
No. 216,164. Patented June 3, 1879.
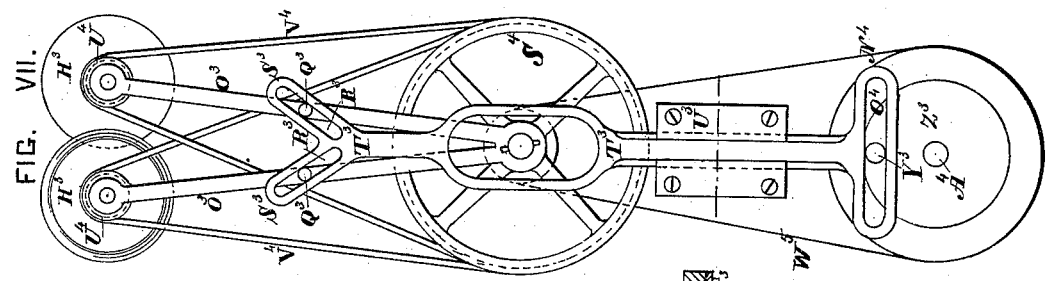
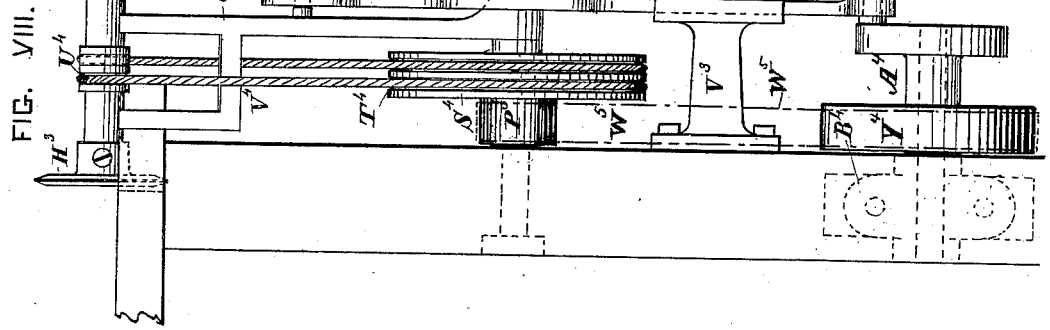
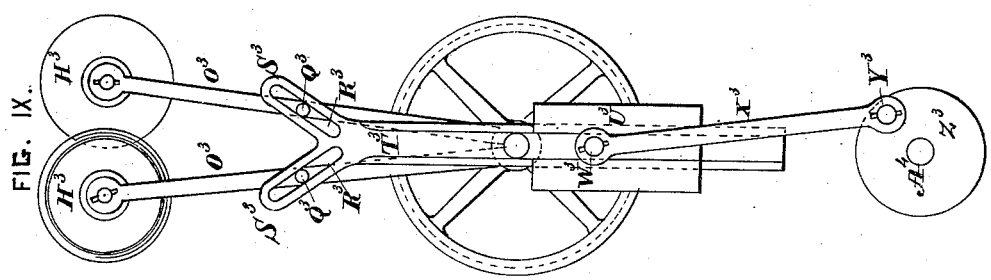
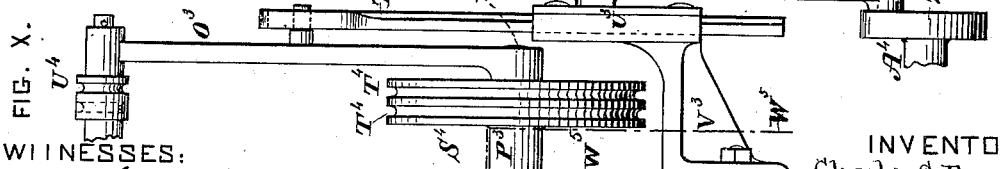
WITNESSES:
Jas. E. Hutchinson.
J. A. Rutherford
INVENTORS.
Charles G. Emery,
William H. Emery,
BY James L. Norris.
THEIR ATTORNEY.

8 Sheets—Sheet 6.
C. G. & W. H. EMERY.
Cigarette-Machine.
No. 216,164. Patented June 3, 1879.
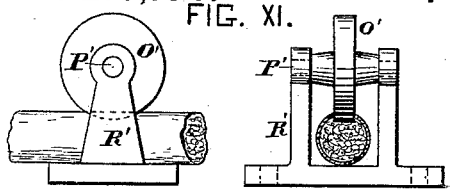
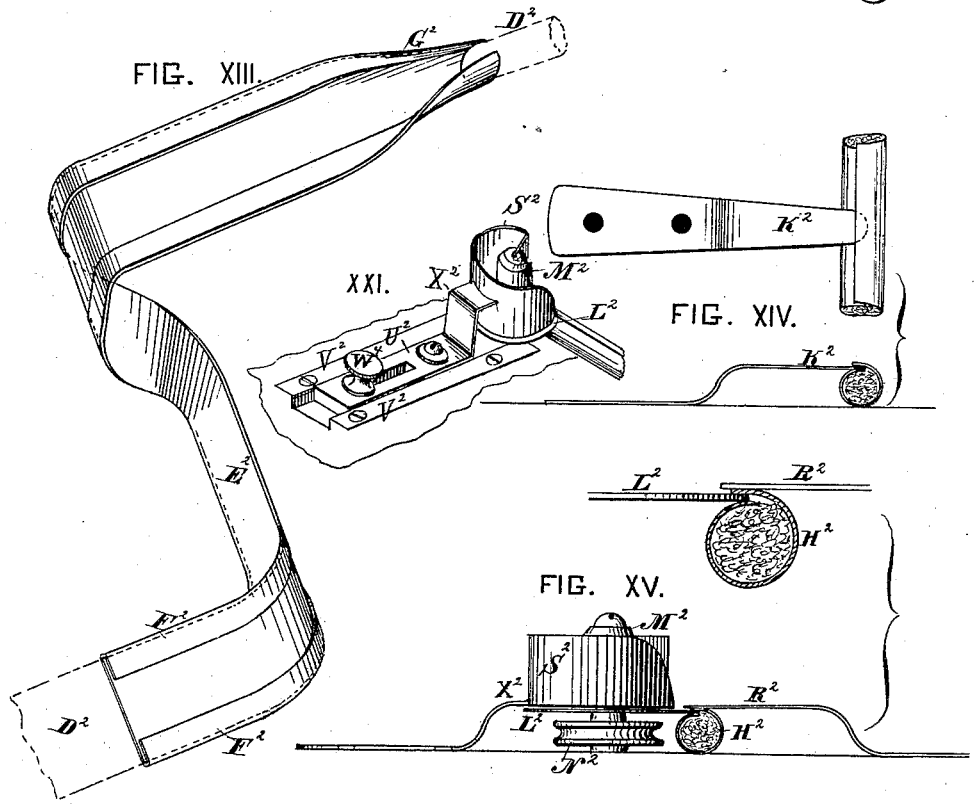
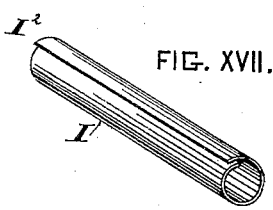
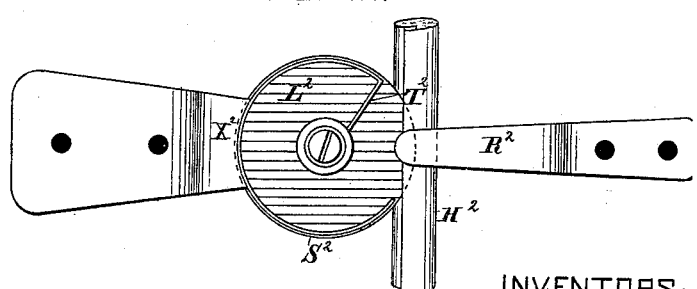
WITNESSES:
Jas. E. Hutchinson.
J. A. Rutherford
INVENTORS:
Charles G. Emery,
William H. Emery,
BY James L. Norris
THEIR ATTORNEY.

C. G. & W. H. EMERY.
Cigarette-Machine.
No. 216,164.   Patented June 3, 1879.
8 Sheets—Sheet 7.
FIG. XVIII.
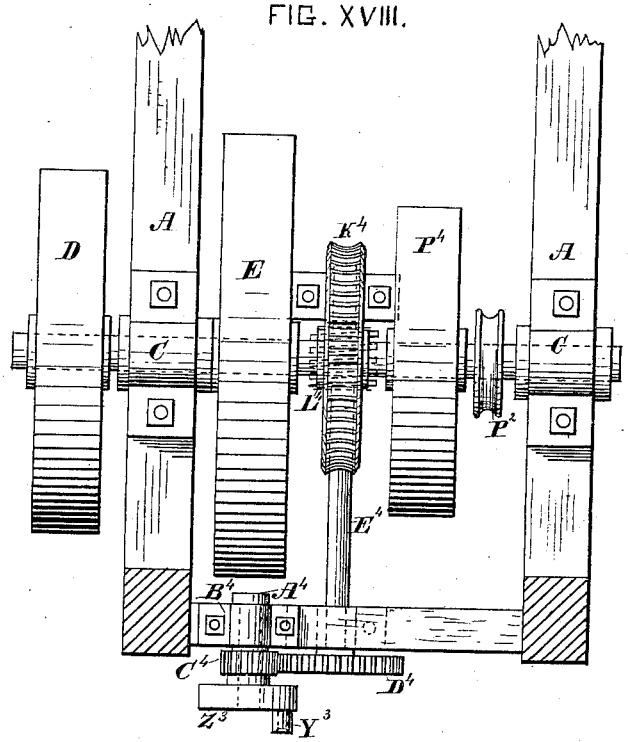
FIG. XIX.
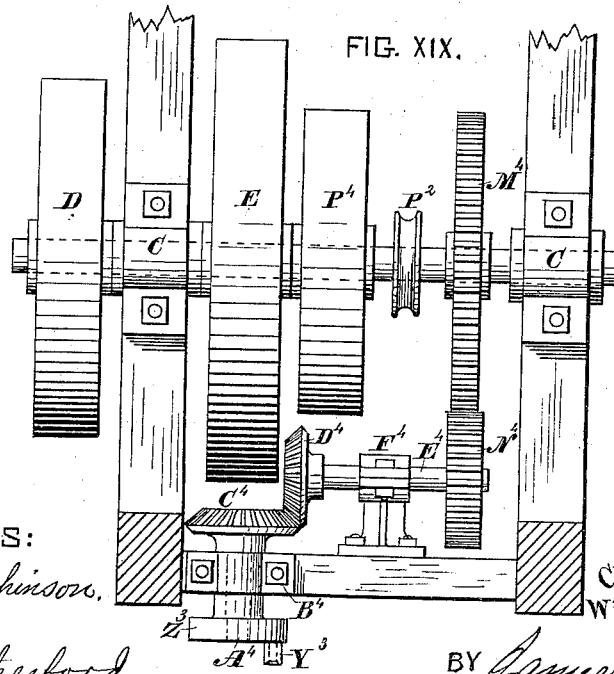
WITNESSES:
Jas. E. Hutchinson.
J. A. Rutherford
INVENTORS:
Charles G. Emery,
William H. Emery,
BY James L. Norris,
THEIR ATTORNEY.

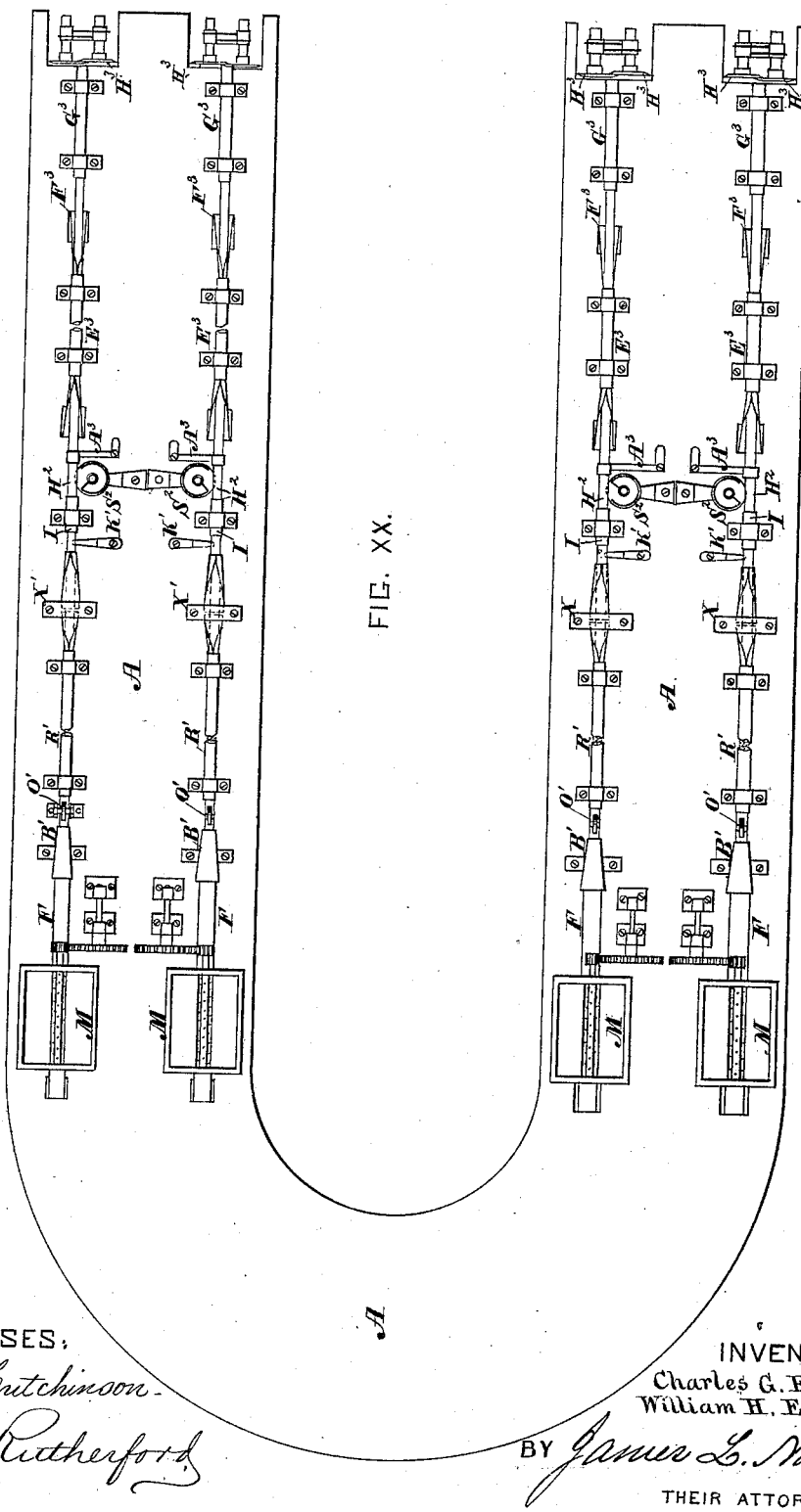

UNITED STATES PATENT OFFICE.

CHARLES G. EMERY AND WILLIAM H. EMERY, OF BROOKLYN, NEW YORK; SAID WILLIAM H. EMERY ASSIGNOR TO SAID CHARLES G. EMERY.

IMPROVEMENT IN CIGARETTE-MACHINES.

Specification forming part of Letters Patent No. 216,164, dated June 3, 1879; application filed April 19, 1879.

*To all whom it may concern:*

Be it known that we, CHARLES GOODWIN EMERY and WILLIAM HANSON EMERY, of Brooklyn, in the county of Kings and State of New York, have invented certain new and useful Improvements in Cigarette-Machines, of which the following is a specification.

The object of this invention is to provide a machine by means of which loose tobacco can be formed into a continuous filler and a continuous inclosing-wrapper formed around said filler and the overlapping edges of the same coated with cement, forming a continuous cigarette, which is fed forward and cut into suitable lengths, the operation being automatic throughout.

To this end the invention consists, first, in the combination, in a machine for manufacturing cigarettes, of a hopper for containing and delivering tobacco, a traveling belt for receiving tobacco from said hopper, and a belt-curver or filler-chamber, whereby tobacco deposited on the belt is carried forward and the belt caused to assume a circular, or approximately circular, form for compressing the tobacco therein for forming a cylindrical filler for a cigarette; second, in the combination, in a machine for manufacturing cigarettes, of a hopper provided with one or more oscillating distributers for containing and delivering tobacco, a traveling belt for receiving tobacco from said hopper, and a belt-curver or filler-chamber, whereby tobacco deposited upon the belt is carried forward and the belt caused to assume a circular, or approximately circular, form to compress the tobacco, thereby forming a cylindrical filler for a cigarette; third, in the combination, with an endless traveling belt for receiving and carrying forward loose tobacco for forming a filler for cigarettes, of a belt-curver or filler-chamber, through which the belt is passed, whereby the same is curved longitudinally a part of its length into tubular, or approximately tubular, form around a filler; fourth, in the combination, with an endless traveling belt for receiving and carrying forward loose tobacco to form a filler, of a belt-curver or filler-chamber and a filler-forming tube, whereby said belt is curved around the tobacco to form a filler for a cigarette; fifth, in the combination, with an endless traveling belt, of a belt-curver or filler-chamber, a filler-forming tube, and a pressure-roller adapted to rotate between the edges of the belt after it is curved around the tobacco to pack the same therein, and to prevent the escape of particles of tobacco over the edges of the belt and to leave said edges free; sixth, in the combination, with an endless belt for receiving and conveying loose tobacco forward to form a filler for cigarettes and a filler-forming tube, of a pulley arrangement for flattening the belt as it leaves the table, whereby the filler is released for subsequently receiving a wrapper; seventh, in the combination, with an endless belt for receiving and conveying loose tobacco forward to form a filler for cigarettes, and with a filler-forming tube, of a pulley arrangement for flattening the belt as it leaves the table and a suitable "bridge" for supporting the filler as it is carried forward to be inclosed or incased in a wrapper; eighth, in the combination, with an endless flexible belt and filler-forming tube, of a guide for wrapping or inclosing a wrapper around said filler and a flexible finger arranged to pass between the overlapping edges of the wrapper for keeping the same separated and compressing and holding the inner and lower edge of the wrapper upon the filler; ninth, in the combination, with an endless belt, a filler-forming chamber, and a guide for applying a wrapper around a filler, of a conductor or chamber, through which the continuous filler and wrapper are conveyed to a suitable pasting device, whereby the swelling of the filler is prevented and the wrapper is held in form while the edges are secured by pasting; tenth, in the combination, with an endless belt, a filler-forming tube, and a guide for wrapping a wrapper around a filler, of a paste supplying and distributing device, and suitable operating mechanism for automatically applying a sufficient and uniform quantity of paste between the overlapping edges of the wrapper; eleventh, in the combination of a gage or former for uniting the edges of the wrapper with a paste supplying and distributing disk and mechanism for operating the same, a guide for wrapping the wrapper around the filler, a filler-forming chamber, and an endless flexible belt; twelfth, in the combination, with an endless flexible belt and a guide-tube, of a delivery-tube and suitable cutting devices, whereby a continuous cigarette of any desired diameter can be advanced and severed into desired lengths.

In the drawings, Figure I represents a perspective view of our improved machine for manufacturing cigarettes; Figs. II, Sheet II, and II$^a$, Sheet III, top views of the same. Figs. III, Sheet II, and III$^a$, Sheet III, represent a view, partly in side elevation and partly in longitudinal section, of the same. Fig. IV, Sheet IV, represents an enlarged top view of that portion of the apparatus where the traveling filler-carrying belt is carried away from the continuous filler and the continuous wrapper applied thereto. Fig. V represents a view of the same portion partly in section and partly in side elevation. Fig. VI represents an elevation showing the mechanism for operating the distributer in the hopper. Fig. VII, Sheet V, represents a detached front view of one modification of the mechanism for operating the cutting devices. Fig. VIII represents a side elevation of the same. Fig. IX represents a detached front view of another modification of mechanism for operating the cutting devices; Fig. X, a side elevation of the same. Fig. XI, Sheet VI, represents detached views of the pressure-roller for packing the tobacco into the endless filler-carrying belt after it has been curved into tubular form by the bell-mouth-shaped belt-curver or filler-chamber. Fig. XII represents detached views of the gage through which the continuous filler and its wrapper are passed after leaving the pasting device. Fig. XIII represents a detached perspective view of the bent or twisted guide for conveying the paper from the paper-roll and causing it to assume a tubular form for receiving the continuous filler. Fig. XIV represents detached views of the flexible finger for separating the overlapping edges of the wrapper and holding the lower or inner edge upon the filler. Fig. XV represents a detached view, in elevation, of the pasting device, showing the paste-supplying disk in position between the edges of the wrapper and the flexible finger for pressing the overlapping edge of the wrapper upon said disk; Fig. XVI, a detached top view of the same. Fig. XVII represents a detached perspective view of the tube having overlapped edges for separating the edges of the wrapper. Fig. XVIII, Sheet VII, represents a view of the rear end of the apparatus with its top removed, showing the driving-shaft with the driving-pulley, the pulley for operating the filler-belt, the pulley for operating the driving-belt, and pulley for operating the pasting device, and a worm-wheel and endless worm-screw and gearing for operating the cutter mechanism. Fig. XIX represents a similar view of a modification of the mechanism, showing the driving-shaft, having mounted thereon the driving-pulley, the pulley for operating the filler-belt, the pulley for operating the driving-belt, and the pulley for operating the pasting mechanism, and gearing for actuating the cutters. Fig. XX represents a top view of a series of cigarette-machines suitably mounted on a table or platform, whereby the entire series can be placed under the charge of a single operator or attendant. Fig. XXI is a detached perspective view, showing the pasting devices adjustably mounted on the tube.

The letter A indicates a table, constructed of any suitable material, and carrying the working parts of our improved apparatus. B indicates the driving-shaft, journaled in bearings C in the frame of the table, near one end, and carrying the driving-pulley D, to which power is transmitted through the medium of a suitable belt.

The letter E indicates a pulley, which carries and gives motion to the filler-carrying belt F, which passes around a similar pulley, G, mounted on a shaft, H, journaled in bearings I$^6$ near the opposite end of the table. Said filler-belt passes up through an opening, L, in the top of the table, and extends forward longitudinally over the top of the same; and immediately above said filler-belt, just in advance of where it passes through the table, is located a hopper, M, supported upon suitable standards, as at N, above said belt. The hopper may, in some instances, be provided with a transverse gate, $n$, adapted to be moved longitudinally to regulate the capacity of the hopper. The said hopper has journaled near its bottom one or more oscillating distributers, P, provided with a series of pins or projections, Q, on its periphery, and projecting through the hopper at one end, where it is provided with a pinion, R, which intermeshes with a gear-wheel; but a cogged segment, S, is preferable, as shown in Figs. II, III, and VI. Said segment or gear wheel is mounted upon the end of a shaft, T, journaled in standards U secured to the top of the table. Said segment or gear wheel on its face is provided with a pin, X, on which may be mounted a friction-roller, W, which works in a longitudinal slot, Y, in the right-angled extension of a reciprocating bar, Z, which sits in ways or guides A$^1$ secured to the frame of the table. The lower end of said bar is provided with a right-angled cross-head, C$^1$, having a horizontal slot, D$^1$, in which sits a pin, E$^1$, secured to a rotating disk, F$^1$, Fig. VI, the latter being mounted on a shaft, G$^1$, which is journaled in the frame of the table. The said shaft G$^1$ is provided with a pulley, I$^1$, over which passes a belt, K$^1$, from a pulley, L$^1$, on the shaft H$^1$, by means of which a rotary motion is given to the shaft G$^1$ and the disk F$^1$, and an oscillating motion is imparted to the distributer P through the medium of the reciprocating bar Z, segment S, and pinion R.

The hopper M is provided at its bottom with an opening, M$^1$, from which extends a gradually-contracted delivery-spout, N$^1$, extending longitudinally over the filler-carrying belt F.

The filler-carrying belt extends forward over the top of the table through a bell-mouth, flaring, or gradually-contracted tube or conductor, $B^1$, which will hereinafter be termed a "belt-curver" or "filler-chamber." It is secured to the top of the table, by means of which the belt is curved longitudinally into an approximately semi-tubular form, inclosing the tobacco dropped from the hopper into an approximately cylindrical shape.

The letter $O^1$ indicates a roller mounted on a shaft, $P^1$, journaled in suitable standards mounted upon the table just in advance of the belt-curver or filler-chamber. Said roller presses upon the tobacco in the curved portion of the belt as it is carried along, thereby preventing the escape of particles of tobacco from between the edges, and leaving the edges of the belt free to be subsequently brought in contact with each other in close union. After passing through the chamber $B^1$, the belt and tobacco are carried together through filler-forming tube $R^1$, in which the belt is formed into a perfect tube, compressing the tobacco into cylindrical shape and forming the filler, which passes continuously forward, as more fully hereinafter described. The filler-carrying belt is then carried forward over a pulley, $S^1$, journaled in a transverse slot, $T^1$, in the top of the table in suitable bearings $U^1$, Figs. II, III, IV, and V, and thence downward around a pulley, $V^1$, journaled in bearings in a hanger, $W^1$, and forward over a roller, to be hereinafter specified.

The letter $X^1$ indicates a metallic plate, which may be termed a "bridge," and it spans or covers the slot $T^1$ just ahead of the pulley $S^1$, around which pulley the filler-carrying belt is carried downward. This bridge serves to sustain the continuous filler, and secures a free passage for it as it proceeds onto the wrapper $H^2$, into and out through the twisted guide.

The letter $A^2$ indicates a paper-reel on a vertical shaft, $B^2$, journaled in bearings on the under side of the table-top in a hanger, $C^2$, and $D^2$ a roll of paper mounted thereon.

The letter $E^2$ indicates a metallic guide, bent or twisted as indicated in Fig. XIII, and extending from a point opposite the paper-roll below the top of the table transversely, then vertically through the aperture $T^1$, and then horizontally forward from the same in line with the filler-carrying belt, as indicated in Fig. V. The edges of said guide are folded over longitudinally, as indicated by the letter $F^2$, forming a channel for the paper, and the forward end is gradually contracted and brought to an approximately conical or circular shape, as indicated at $G^2$. The paper passes up through this guide, and is gradually brought into cylindrical shape, and at the same time wrapped around the continuous filler, as shown at $H^2$.

In proximity to the outlet of the twisted guide is a flexible finger, $K^2$, passing between the two edges of the paper tube or wrapper, for keeping the edges of the wrapper separated, compressing and holding the lower or inner edge upon the filler, and guiding and holding it in proper form. The filler with its wrapper is then conducted into a chamber or tube, I, the edges of which overlap each other, so as to leave an intervening space between the said edges of sufficient size for the passage of one edge of the projecting paper or wrapper. This tube also prevents the swelling of the filler and consequent expansion of the wrapper, and retains the filler and wrapper in form until the edges of the wrapper are secured by pasting.

The pasting device or mechanism is located near the end of the tube or chamber I, in such position that the disk $L^2$, which supplies the paste to the wrapper, will have its edge, during rotation, between the two edges of the wrapper. In the present example the said disk supplies the paste to the under side of the upper overlapping edge of the wrapper; but it may be constructed to apply it to the other edge or to both edges. Rotary motion is imparted to said disk $L^2$, which revolves underneath the paste-reservoir $S^2$, and forms the bottom thereof, in any suitable manner, so as to take up and deliver a sufficient and uniform quantity of paste to the edge or edges of the wrapper. In the present instance the paste-disk is mounted upon an upright journal, $M^2$, and is rotated thereon by means of a pulley, $N^2$, around which is carried an endless band, $O^2$, passing over pulleys $o^2$, Fig. $III^a$, and around a pulley, $P^2$, on the driving-shaft B of the machine. A flexible finger, $R^2$, is located in proper respect to the pasting-disk in such manner as to hold the overlapping portion of the wrapper, which receives the paste down upon said pasting-disk, and insure the application of the paste to such overlapping portion.

The paste-reservoir is provided with a suitable gate or doctor, $T^2$, for regulating the quantity of paste, in order that it may be supplied uniformly to the wrapper. In this example the paste device is made stationary on the table.

In the modification indicated in Fig. XXI the upright carrying the paste-distributing disk and the paste-receptacle are mounted upon an adjustable plate, $U^2$, sitting in a guide, $V^2$, formed directly in the table or in a metallic plate sitting in a recess in the table, and confined therein by means of a set-screw, $W^4$, passing through a slot in the adjustable plate $U^2$, by means of which the paste cup and disk can be readily removed for cleansing and can be adjusted to and from the edges of the wrapper.

The letter $A^3$, Fig. XII, indicates a gage located just beyond the pasting device, through which the pasted paper and filler pass after leaving the pasting device, by means of which the overlapping edges of the wrapper which incloses the continuous filler are secured. Said gage may be made adjustable, if desired, as shown in Figs. II$^a$, Sheet III, and XII, Sheet VI, of the drawings.

Just beyond said gage is an opening, B$^3$, in the table, through which the filler-carrying belt again passes upward from beneath the table over a pulley, C$^3$, mounted on a shaft journaled in bearings D$^3$, Fig. II$^a$. The filler-carrying belt then passes forward through a tube, E$^3$, secured to the top of the table. The filler in its sealed wrapper, which may be termed a "continuous cigarette," is again taken up by the filler-carrying belt, and is conducted through the tube E$^3$. Said tube causes the belt to again assume its circular form, inclosing the continuous sealed cigarette, whereby the same is carried through the tube E$^3$, which may be surrounded with a heating-jacket to cause the adhesive cement to dry or to set, and impart a finish to the continuous cigarette. After passing through the tube E$^3$ the filler-carrying belt again passes down through an opening, F$^3$, in the top of the table, over the pulley E on the driving-shaft, back to the pulley G, passing on its way over a double-flanged roller journaled at one end of a lever, J$^3$, to the other end of which is secured a counter-balance, by means of which the filler-belt is kept taut. The continuous cigarette is conducted from the tube E$^3$ into and through a cylindrical guiding or delivery tube, G$^3$, by the belt F, and the receiving end should be made of bell-mouth shape, by which the said finished continuous cigarette is readily received, and by the cylindrical part retained in a perfectly straight and uniform condition, the result being that as the same issues from the guide or delivery tube it will be delivered in proper position to be cut into suitable lengths, which may be done by an operator by a pair of scissors or other suitable device.

It will thus be seen that the cigarettes can be cut off by the operator; but we prefer to automatically cut or sever the same, and have devised mechanism to carry the same into effect; but we wish it to be understood that we do not intend to limit ourselves to any particular mechanism for the purpose.

In the present example we have illustrated several modes or forms of mechanism for operating the cutters, which may be of a circular or the ordinary blade form.

The cutters in the present example consist of two circular knives, H$^3$, mounted upon journals having their bearings at the upper ends of the levers O$^3$, which are fulcrumed to a boss, P$^4$, attached to the table-frame. The said levers are provided with pins Q$^3$, which sit in the slots R$^3$ in the branches S$^3$ of a bifurcated reciprocating bar, T$^3$, which travels in ways or guides U$^3$ in a bracket, V$^3$, attached to the table-frame.

To said reciprocating bar is pivoted, at W$^3$, the upper end of a link, X$^3$, the lower end of which is pivoted to a crank-pin, Y$^3$, on a disk, Z$^3$, which is mounted upon a journal, A$^4$, having its bearing in box B$^4$, secured to the table-frame. Said journal carries a gear-wheel, C$^4$, which intermeshes with a gear-wheel, D$^4$, mounted on a shaft, E$^4$, having its bearings in the frame of the table at F$^4$. Motion is imparted to said journal from the driving-shaft by means of any suitable gearing. As shown in Figs. II$^a$ and III$^a$ of the drawings, the power is transmitted to said shaft E$^4$ by means of a belt, G$^4$, extending around a pulley, H$^4$, on the driving-shaft and a pulley, I$^4$, on the said shaft E$^4$. In the modifications represented in Figs. XVIII and XIX motion is imparted to said journal E$^4$ by means of positive gearing.

As illustrated in Fig. XVIII, the driving-shaft is provided with a worm-wheel, K$^4$, which intermeshes with an endless or worm screw, L$^4$, at one end of the shaft E$^4$, the other end of said shaft carrying gear-wheel D$^4$, which intermeshes with the gear-wheel C$^4$ on the shaft A$^4$.

As illustrated in Fig. XIX, the driving-shaft is provided with a cog-wheel, M$^4$, which intermeshes with a cog-wheel, N$^4$, on the shaft E$^4$, which carries the gear-wheel D$^4$, intermeshing with the gear-wheel C$^4$ on the shaft E$^4$, for transmitting motion to the cutter-operating devices. A belt, O$^4$, extends from a pulley, P$^4$, on driving-shaft to a pulley, R$^4$, on the shaft H, in order to transmit motion from the driving-shaft to said shaft H.

It is absolutely necessary that a rapid and uniform motion should be imparted to the cutters; and we propose to organize and arrange mechanism by means of which in the neighborhood of three thousand revolutions and upward per minute may be imparted to said cutters in a manner substantially as follows: To the boss P$^5$ is journaled a revolving pulley, S$^4$, having two parallel grooves, T$^4$, in its periphery, from which extend the endless bands V$^4$ over the grooved pulleys U$^4$, mounted on journals having their bearings at the upper ends of the respective levers O$^3$. The said pulley S$^4$ has rigidly attached to it a smaller pulley, P$^3$, around which extends an endless belt, W$^5$, from a pulley, Y$^4$, mounted on the shaft A$^4$. The respective pulleys Y$^4$, P$^3$, S$^4$, and U$^4$ are of such diameter relatively to each other that the cutters H$^3$ will be revolved at a high rate of speed, by means of which a shear-cut will be given when the cutters are brought together upon the cigarette, and the lengths evenly and neatly separated.

Other mechanism may be substituted for the drum on the shaft A$^4$ for driving pulley S$^4$—as, for instance, gearing connected directly with the driving-shaft of the machine or other working parts thereof.

One or more sets of apparatus may be run by one attendant, and they may be conveniently arranged, as shown in Fig. XX, in two sets, each at the right and left of the attendant, with a connecting-table in front.

The various tubes or conductors employed in forming the filler, applying the wrapper, and completing the continuous cigarette may be of any desired length or size, and of any desirable material, such as metal, glass, or porcelain.

The operation of our improved apparatus is as follows: Long-cut tobacco which has been drawn or impregnated with moisture several hours before is deposited in the hopper, being thrown lightly in and evenly distributed, so as not to pack or bring the weight of the top of the mass on the lower portions of the same. The working parts of the apparatus having been set in motion, the distributer will separate and distribute the tobacco in about uniform quantities and parcels upon the filler-carrying belt, making a continuous and unbroken mass, free from all lumps and matting.

The endless belt with the tobacco then enters the flaring-tube belt-curver or filler-chamber, and as it travels toward the contracted end it is curved into an approximately tubular form around the tobacco. As it emerges from said chamber the roller just ahead of the same presses and compacts the tobacco, so as to prevent the escape of the same over the sides of the belt, leaving the edges of the belt free to be subsequently closed over the tobacco. From thence it passes into the filler-forming tube, in which the belt is completely wrapped around the tobacco, forming a cylindrical filler. The belt then passes over the pulley in the opening and through the table just ahead of the filler-forming tube, and the filler in a continuous mass passes forward over the bridge to the wrapping devices, being supported on its way by the bridge. It then enters the upper or horizontal portion of the guide, through which a wrapper or strip of paper is fed from below in a continuous piece from a feed-roller.

The contracted end of the guide through which the paper and filler pass gradually folds the paper into a cylindrical tube around the moving filler, and the two pass on together into the tube just ahead, having overlapping edges, in which the edges of the paper are overlapped and prepared for the reception of the adhesive cement or paste. This is applied by the rotating disk of the pasting device, the edge of which rotates between the overlapped edges of the paper, distributing the paste evenly to the upper overlapped edge, which is held against the disk by means of the flexible finger, the paste being evenly distributed to the disk by means of the doctor, forming part of the paste-receptacle. After passing the pasting devices the filler and its wrapper pass through a gage or tube, by means of which the pasted edges are united. Just beyond the gage the filler-belt is brought upward through a suitable opening in the table and over a pulley and caused to pass through a cylindrical tube, the filler and wrapper entering along with it. In this tube the belt is curved around the filler and its wrapper, drawing them forward, compressing and holding the cemented edges of the wrapper together until the paste or cement has set. The completed continuous cigarette then passes through a final guide or delivery tube, by means of which it is guided and presented to the operator for cutting, or to the automatic cutters, which operate at suitable intervals to cut the continuously-moving cigarette into proper lengths; which drop into a suitable spout, by which they are discharged into a proper receptacle.

The various parts of the apparatus are so constructed and arranged that they will work in proper relation to advance the continuous cigarette to the cutters at a uniform speed, and so that the cutters will be operated at uniform intervals to serve the cigarettes in uniform and equal lengths. Should the mass of tobacco on the belt after it has been delivered from the hopper from any accident become broken or insufficient in quantity, the attendant can remedy the fault by placing a sufficient quantity of tobacco on the belt to fill up the space.

What we claim is—

1. The combination, in a machine for manufacturing cigarettes, of a hopper for containing and delivering tobacco, a traveling belt for receiving tobacco from said hopper, and a belt-curver or filler-chamber, whereby tobacco deposited upon the belt is carried forward, and the belt caused to assume a circular, or an approximately circular, form for compressing the tobacco therein, thereby forming a cylindrical filler for a cigarette, substantially as described.

2. The combination, in a machine for manufacturing cigarettes, of a hopper provided with one or more oscillating distributers for containing and delivering tobacco, a traveling belt for receiving tobacco from said hopper, and a belt-curver or filler-chamber, whereby tobacco deposited upon the belt is carried forward, and the belt caused to assume a circular, or an approximately circular, form for compressing the tobacco therein, thereby forming a cylindrical filler for a cigarette, substantially as described.

3. In combination with an endless traveling belt for receiving and carrying forward loose tobacco to form a filler for cigarettes, a belt-curver or filler-chamber, through which the belt is passed, whereby the same is curved longitudinally a part of its length into tubular, or approximately tubular, form around a filler, substantially as described.

4. In combination with an endless traveling belt for receiving and carrying forward loose tobacco to form a filler, a belt-curver or filler chamber and a filler-forming tube, whereby said belt is curved around the tobacco to form a filler for a cigarette, substantially as described.

5. In combination with an endless traveling belt, a belt-curver or filler-chamber, a filler-forming tube, and a pressure-roller adapted to rotate between the edges of the belt after it is curved around the tobacco to pack the same therein, and to prevent the escape of particles of tobacco over the edges of the belt, and to leave said edges free, substantially as described.

6. The combination, with an endless belt for receiving and conveying loose tobacco forward to form a filler for cigarettes and a filler-forming tube, of a pulley arrangement for flattening the belt as it leaves the table, whereby the filler is released for subsequently receiving a wrapper, substantially as described.

7. The combination, with an endless belt for receiving and conveying loose tobacco forward to form a filler for cigarettes, and with a filler-forming tube, of a pulley arrangement for flattening the belt as it leaves the table and a bridge for supporting the filler as it is carried forward to be inclosed or incased in a wrapper, substantially as described.

8. The combination of a flexible belt and a filler-former tube with a guide for delivering a wrapper, whereby a filler for cigarettes is made and wrapped in a wrapper to form a cigarette, substantially as described.

9. In combination with an endless flexible belt and filler-forming tube, a guide for wrapping or inclosing a wrapper around said filler and a flexible finger arranged to pass between the overlapping edges of the wrapper for keeping the same separated and compressing and holding the inner and lower edge of the wrapper upon the filler, substantially as described.

10. In combination with an endless belt, a filler-forming chamber, and a guide for applying a wrapper around a filler, a conductor or chamber through which the continuous filler and wrapper are conveyed to a suitable pasting device, whereby the swelling of the filler is prevented, and the wrapper is held in form while the edges are secured by pasting, substantially as described.

11. In combination with an endless belt, a filler-forming tube, and a guide for wrapping a wrapper around a filler, a paste supplying and distributing device, and suitable operating mechanism for automatically applying a sufficient and uniform quantity of paste between the overlapping edges of the wrapper, substantially as described.

12. The combination of a gage or former for uniting the edges of the wrapper with a paste supplying and distributing disk, and mechanism for operating the same, a guide for wrapping a wrapper around the filler, a filler-forming chamber, and an endless flexible belt, all to operate in a manner substantially as described.

13. In combination with devices for forming a continuous cigarette, an endless belt and a guide-tube, whereby a continuous filler in a sealed wrapper is inclosed and carried forward, substantially as described.

14. In combination with devices for forming a continuous cigarette of any desired size, an endless belt, a guide-tube, and a delivery-tube, whereby a continuous cigarette is presented to the action of suitable cutting mechanism for division into desired lengths, substantially as described.

15. The combination of an endless belt and guide-tube with a delivery-tube and suitable cutting devices, whereby a continuous cigarette of any desired diameter can be advanced and severed into desired lengths, substantially as described.

16. The combination, in a cigarette-machine, of a traveling belt for carrying the tobacco forward, a hopper with one or more distributers for distributing the tobacco thereon, a belt-curver or filler-chamber for curving the belt around the tobacco to form a continuous filler, a guide for conducting the wrapper to the filler and enveloping the same therein, and a suitable device for pasting the edges of the wrapper to form a continuous cigarette, with or without suitable devices for cutting it into lengths desirable for the market, substantially as described.

In testimony that we claim the foregoing we have hereunto set our hands in the presence of the subscribing witnesses.

CHARLES G. EMERY.
WILLIAM H. EMERY.

Witnesses:
JAMES L. NORRIS,
FRANK W. EMERY.